Nov. 7, 1933.    I. E. SIQVELAND    1,933,768
FRICTION CONTROLLED SPRING
Filed Oct. 21, 1932
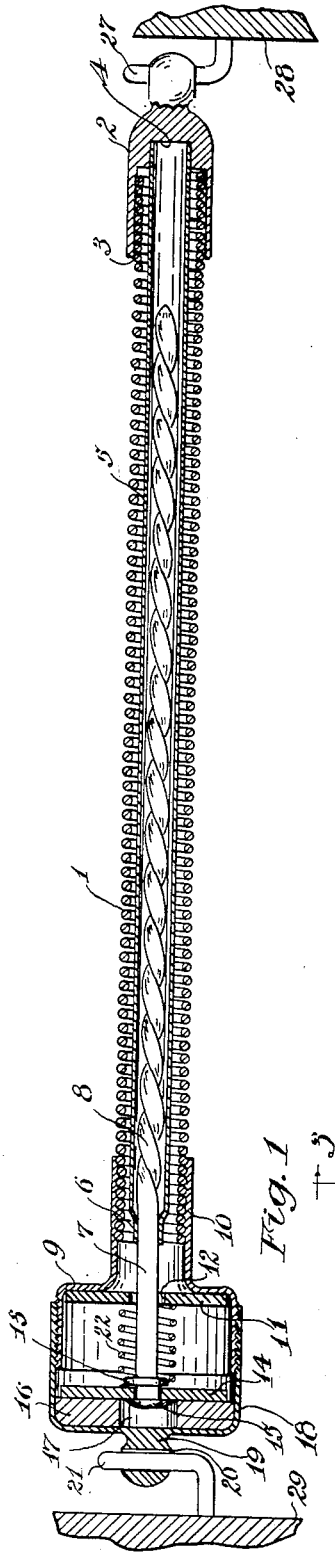
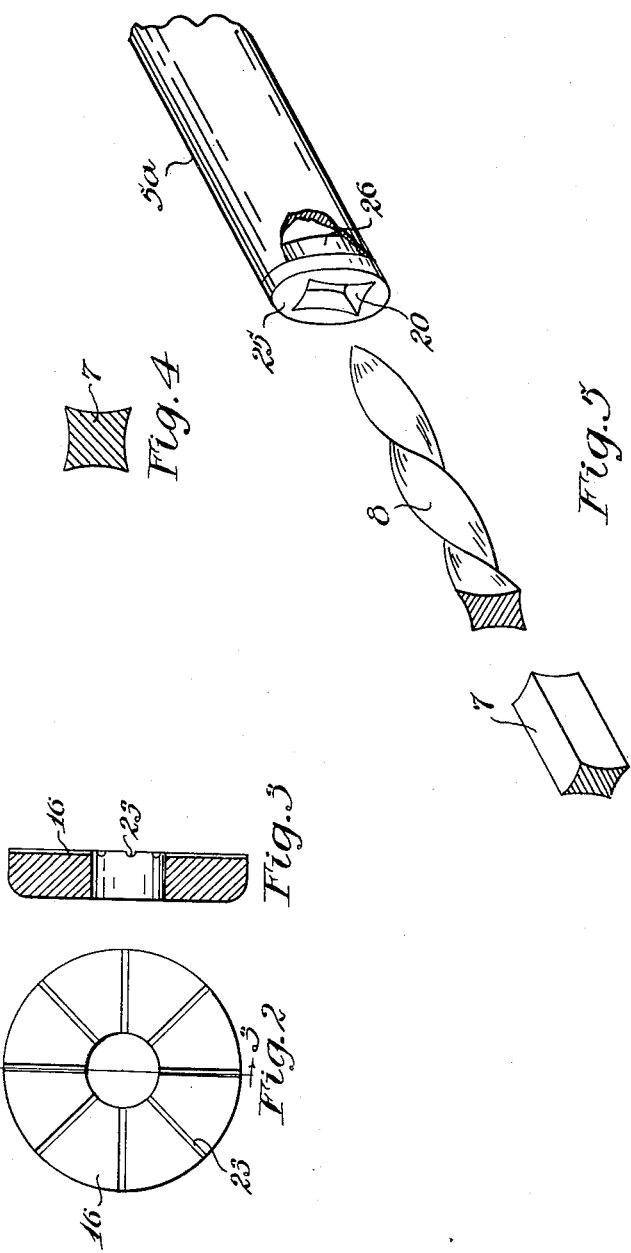
INVENTOR
Ivar E. Siqveland
BY
ATTORNEY Patented Nov. 7, 1933

1,933,768

UNITED STATES PATENT OFFICE 1,933,768

FRICTION CONTROLLED SPRING

Ivar E. Seqveland, St. Paul, Minn.

Application October 21, 1932. Serial No. 638,890

5 Claims. (Cl. 267—1)

The present invention relates to a friction controlled spring.

It is frequently desired to control the action of springs, such as door springs, so that the full tension of the spring may be employed, but, at the same time, that the action of the spring be slowed down so as to prevent jarring and slamming of the parts to which the spring may be connected. This is particularly true of door closing springs, and various attempts have been made to slow down the action of this type of spring, as in the well known hydraulic control door springs and other types of spring controls using plungers and similar mechanisms acting within a cylinder or enclosure to resist the action of the spring.

An object of the present invention is to make an improved and simplified spring control mechanism.

In order to attain this object, there is provided, in accordance with one feature of the invention, a tension spring having fastening means connected one to each end thereof. A rotatable member having frictional engagement with a stationary member is mounted to be rotated upon a return to normal of the spring after an extension of said spring to act as a brake, resisting the return to normal of said spring.

These and other features of the invention will be more fully brought out in the following description and the accompanying drawing, wherein:

Figure 1 is a longitudinal, sectional view through a spring embodying the present invention.

Figure 2 is a plan view of a friction washer showing radially disposed grooves therein.

Figure 3 is a sectional view on the line 3—3 of Figure 2.

Figure 4 is a transverse, sectional view of a preferred type of rod employed in the device; and Figure 5 is a fragmentary view, in perspective, of a preferred form of tube, a portion of a helically twisted rod, and a straight portion of said rod, respectively.

Referring to the drawing in detail, a coil spring 1 is a normal tension type, ordinarily used in closing doors. A fastening member 2 is provided with a recess 3 adapted to receive an end of the spring 1 therein, and is provided with a deeper, central recess 4 adapted to closely receive a tubular member 5 therein. The spring 1 and tubular member 5 may be securely connected to the member 2, as by brazing. The opposite end of the tube 5 is reduced as at 6, and is provided with a rectangular opening therein adapted to freely receive a rod 7, of square cross section therein. The portion 8, of the rod, is twisted so that the edges of the rod will assume the form of a plurality of helices. A cup-shaped member 9 is provided with a neck portion 10 adapted to receive the spring 1 therein, and this neck portion may be threaded to threadedly receive the spring 1 therein. A washer 11 is mounted in the lower portion of the cup 9 and is provided with a round central opening 12, of a size to permit the rod 7 to rotate freely therein. The rod 7 is provided with a flange 13, preferably formed integrally therewith, and a discoid friction member 14, which is preferably of metal, is provided with a square, central opening of slightly larger dimensions than the rod 7, so that the rod may enter freely therein, but will cause the disk 14 to rotate with the rod 7. The outer end of the rod 7 is riveted as at 15 to hold the disk 14 on the rod, the distance between the riveted portion 15 and the flange 13 being somewhat greater than the thickness of the disk 14, so as to permit a slight wobble movement of the disk 14 to permit it to seat on an annular friction member 16, which may be of leather, and is provided with a circular, central opening 17 to provide clearance for the riveted end 15 of the rod. Said annular friction member 16 is mounted in a second cup-shaped receptacle 18, which has threaded engagement with the cup-shaped member 9. A boss 19 is formed on the outer end of the cup-shaped receptacle 17 and is provided with an opening 20 by means of which it may be connected to a hook 21, or other supporting member.

A light coil spring 22 is held in compression between the disk 14 and the washer 11 to normally hold the disk 14 in frictional engagement with the member 16. It is preferred that radially disposed grooves 23 (see Figures 2 and 3) be cut in the face of the friction member 16, so that any oil or dust particles will be wiped, by the rotation of the disk 14, from the face of the member 16 into these grooves, and thus insure uniform, frictional engagement between the disk 14 and the member 16.

In its preferred form, the rod 7 is of concave-side construction, as indicated by the sectional view shown in Figure 4, instead of a straight-sided square form, since with this construction the corners of the opening in the end of the tube may be formed to substantially coincide with the exterior shape of the rod, as illustrated in Figure 5, which reduces wear at the corners of the square opening 24.

In the construction shown in Figure 5, a disk 25, of the same exterior diameter as the tube 5—a, is provided with a reduced portion 26 adapted to have a close fit within the end of the tube 5—a and is securely fastened therein as by brazing. This member 25 is provided with a square opening 24 to receive the rod 7 therein.

The operation of the device is as follows, it being assumed, for the purpose of the present description, that the device is to be used as a door spring, although the device has a wide field of usefulness aside from this particular application, as will be apparent to those versed in the art. The member 2 is fastened to a hook 27 which may be secured to a door 28, while the other end of the device is secured to the hook 21, which may be mounted to a portion of the door frame 29. Upon opening the door, the spring 1 will be extended, the tubular member 5 moving outwardly with the fastening member 2, and the square end 6 of the tubular member 5 will be slidably moved along the square rod 7. Upon engaging the helically twisted portion 8 of the rod, the rod will be caused to rotate, and, since the disk 14 is mounted to rotate with the rod 7, this disk will also be rotated. During this outward movement there will be some frictional engagement between the rod 7 and the square opening in the end of the tubular member 5, which will tend to draw the disk 14 away from the frictional member 16 against the tension of the light coil spring 22, and thereby reduce the frictional engagement between the disk 14 and the friction member 16. Upon releasing the door, the tension of the coil spring 1 will tend to draw the door to a closed position. The frictional engagement between the squared opening in the end of the tubular member 5 and the rod 7, will, upon this return movement, force the disk 14 against the friction member 16, being assisted in this movement by the light coil spring 22. The rotation of the disk 14 upon the friction member 16 acts as a brake, and thereby slows down the action of the spring. If it is desired that the braking action be discontinued before the door is entirely closed, the rod 7 may be left straight for a greater portion of its length than illustrated in the drawing, since the braking action only takes place while the square opening in the end of the tube 5 is in engagement with the twisted portion of the rod, as otherwise the disk 14 will not be rotated. This is so clearly evident that it is felt unnecessary to illustrate such modifications in the drawing.

This releasing of the braking action just prior to the closing of the door is sometimes desirable, where a door has a latch which is somewhat difficult to close, and permits the full force of the spring to be exercised for a short distance, say one or two inches, so that the resistance of the latch may be overcome by this additional force. The force of engagement between the rotatable disk 14 and the friction member 16 may be increased by screwing the two cup-shaped receptacles, 9 and 18, closer together, thereby compressing the coil spring 22 and increasing the force of the spring against the disk 14. Conversely, the frictional engagement can, of course, be reduced by unscrewing these members somewhat.

It will be apparent that the greater the pull of the spring, the greater will be the frictional resistance of the square opening in the end of the tube with the helical portion 8. This presses the disk 14 more tightly against the friction element 16 and increases the braking action, and, it has been found in practice, that the rate of closing of the door is substantially uniform throughout its travel due to this effect.

It also will be noted, that the shorter the pitch of the helical, the greater number of turns the disk 14 will make in a fixed travel of the helical through the square opening in the end of the tube. Therefore, by using a helical with a shorter pitch, a greater braking action will be obtained than would be the case in a helical of relatively longer pitch, other factors being equal.

The shape and size of the parts are, of course, not material to the invention, as it would be well within the capacities of an ordinary mechanic, familiar with the present structure, to modify the device in several ways and still maintain the same principle of operation. It is deemed unnecessary to illustrate and describe such modifications, but it is not desired to limit the invention, except as defined in the following claims.

I claim:

1. A spring control apparatus, comprising in combination with a spring, a helical cam member rotatably mounted at one end of said spring, a rotatable member connected to rotate with said helical cam member, a friction member fixedly mounted adjacent said rotatable member, secondary spring means mounted to resiliently force said rotatable member into frictional engagement with said fixed member, and means fixedly connected to the opposite end of said spring to engage said helical member to rotate said helical member on an operative movement of said spring to retard the operative movement of said spring.

2. A spring control apparatus, comprising in combination with a spring, a rotatable member mounted adjacent one end of said spring, a helical cam member connected to said rotatable member to rotate therewith, a friction member fixedly mounted adjacent said rotatable member, a cam fixedly connected to the opposite end of said spring, and having operative engagement with said helical member to rotate said helical member and said rotatable member upon an operative movement of said spring, to retard the operative movement of said spring.

3. A spring control apparatus, comprising in combination with a spring, a housing carried by one end of said spring, a rotatable member mounted therein, a helical cam member connected to rotate with said rotatable member and extending parallel to the direction of action of said spring, a friction member fixedly mounted in said housing adjacent said rotatable member, and a cam member fixedly connected to the opposite end of said spring to that supporting said housing to engage said helical cam member on an operative movement of said spring to rotate said helical cam member and said rotatable member, to retard the operative movement of said spring.

4. A spring control apparatus comprising in combination with a spring a helical cam member, a cooperative member mounted to rotate therewith, friction means mounted adjacent said cooperative member to have frictional engagement therewith, and a cam carried by said spring and having relatively longitudinal movement with respect to said helical cam on an operative movement of said spring to relatively move said cooperative member with respect to said friction means to retard the operative movement of said spring.

5. A spring control apparatus, comprising in combination with a spring, a helical cam member, said helical cam member having a portion of reduced curvature within the operative limits thereof to reduce the effective movement thereof, a co-operative member associated with said helical cam member, friction means mounted adjacent said cooperative member to have frictional engagement therewith, and a cam carried by a spring element and having relatively longitudinal movement with respect to said helical cam on an operative movement of said spring to relatively move said co-operative member with respect to said friction means to retard the operative movement of said spring.

IVAR E. SIQVELAND.